(12) United States Patent
Gallery et al.

(10) Patent No.: US 6,995,759 B1
(45) Date of Patent: Feb. 7, 2006

(54) VIRTUAL ENVIRONMENT NAVIGATION AID

(75) Inventors: Richard D. Gallery, Dublin (IE); Dale R. Heron, Ashtead (GB); Clive R. Van Heerden, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/170,468

(22) Filed: Oct. 13, 1998

(30) Foreign Application Priority Data

Oct. 14, 1997 (GB) .................................. 9721667

(51) Int. Cl.
*G06T 15/00* (2006.01)

(52) U.S. Cl. ...................... 345/419; 345/427; 345/428; 715/736; 715/737; 715/526

(58) Field of Classification Search ................ 345/419, 345/428, 355, 427; 715/736, 737, 526
See application file for complete search history.

(56) References Cited

U.S. PATENT DOCUMENTS

| | | | | |
|---|---|---|---|---|
| 6,052,123 A | * | 4/2000 | Lection et al. .............. | 345/419 |
| 6,058,397 A | * | 5/2000 | Barrus et al. ................ | 707/104 |

FOREIGN PATENT DOCUMENTS

| | | |
|---|---|---|
| EP | 0697613 A2 | 2/1996 |
| EP | 0797173 A1 | 9/1997 |

OTHER PUBLICATIONS

"Navigation and Locomotion in Virtual Worlds via Flight into Hand-Held Miniatures" by R. Pausch et al, ACM Siggraph '95 Conference Proc., Comp. Graphics, Jul. 1995.
"Building VRML Worlds", by E. Tittel et al, McGraw Hill, 1997, pp. 26-31.

* cited by examiner

*Primary Examiner*—Kimbinh T. Nguyen
(74) *Attorney, Agent, or Firm*—Edward W. Goodman

(57) ABSTRACT

A virtual environment browser (64) holds a number of clip-in files (70, 72, 74) defining guide characters—locally generated visual aids to navigation that appear within a generated image of a virtual environment and follow a user's input (80) navigational commands to provide an advance cue as to the effects of an input command. Where the virtual environment data is supplied from a remote source (62) and includes (78) an indication of a preferred mode for navigating that environment, for example, flying or walking, the browser (64) detects this indication and automatically selects the appropriate guide character. Scaling (84) of the guide character to match the scale of the virtual environment, or such as to render the guide character unobtrusive, may also be provided.

8 Claims, 4 Drawing Sheets

VIRTUAL ENVIRONMENT NAVIGATION AID

BACKGROUND OF THE INVENTION

1. Field of the Invention

The present invention relates to apparatus for accessing, from a remote source, data defining a graphical representation of a virtual environment, with the user being enabled to navigate by selecting and controllably altering a viewpoint within the virtual environment, the apparatus having means for rendering a display of the virtual environment from that viewpoint.

2. Description of the Related Art

A description of a service providing a virtual environment (or cyber-space) accessible by remote users is given in European Patent Application No. EP-A-0 697 613, corresponding to U.S. Pat. No. 6,085,256 (Sony Corp.). The system described includes a server providing a virtual reality space, and user terminals connected to the server via a high-speed communications network (using optical fibers or the like). In operation, the server maintains a number of virtual environments and supports many differing terminal types by the use of conversion objects between information objects and user objects, i.e., the conversion objects provide individually tailored translation for communications back and forth between each type of terminal and each configuration of virtual environment supported. A particular benefit arises when the format of data storage and representation for virtual environments is at least partially standardized, allowing for greater interchange between systems of different manufacturers as well as a reduction in the necessity for individually tailored translation utilities. With at least partial standardization, the necessary configuration of a browser for accessing such data, whether in hardware or software implementation or a mixture of the two, becomes simpler.

A notable example of standardization in the field of data-defining virtual environments is the so-called Virtual Reality Modelling Language (VRML) as described, for example, in the VRML standard, version 2.0, issued as ISO/IEC WD14772 on Aug. 4, 1996. VRML is a file format for describing interactive three-dimensional objects and worlds to be experienced on the Internet/World Wide Web and it is generally analogous to the way HTML (HyperText Markup Language) is used to describe documents for transmission over the Internet. A number of examples of VRML browsers are discussed in "Building VRML Worlds" by E. Tittel et al., published by McGraw Hill 1997, ISBN 0-07-882233-5, at pages 26 to 31. The functionalities of the different browsers depend, to a large extent, on their target host system and the likely uses of the same, as well as whether they are purpose-built/written or whether they are modifications of earlier utilities.

As the number of different systems providing virtual environments, and the number of different navigation and interaction techniques, increase coupled with the increasing number of users accessing such systems, a need has arisen for a means to allow inexperienced users to simply navigate virtual environments. The problem is one of perception coupled with expectation, i.e., even where the virtual environment is a close simulation of a real-world scenario, the inexperienced user may be put off by the process of learning a new way to navigate what should be a familiar situation. Because of the possibilities offered to the designer, many virtual environments present exotic and fantastic scenarios that even the experienced "virtual navigator" can find difficulty with at first.

SUMMARY OF THE INVENTION

It is an object of the present invention to provide a user operable means for browsing data defining a virtual environment and rendering a view of the same, including the generation of a visual aid to assist user navigation of the environment.

In accordance with the present invention, there is provided a data processing apparatus configured as a virtual environment data browser, the apparatus comprising a processor coupled with at least one memory device and data network interface means capable of receiving data defining a virtual environment and objects therein when coupled to a data network including a source of such data, the apparatus further comprising user input means and rendering means configured to periodically generate an image based on said data defining the virtual environment and objects and from a viewpoint at a location and with an orientation in said virtual environment determined at least partially by input from said user input means, characterized in that the apparatus further comprises a clip store containing data defining the appearance of a further virtual environment object when viewed from a plurality of directions, the rendering means being configured to generate an image of said further virtual environment object from one of said plurality of directions determined by the user input commands to move said viewpoint, and to patch said generated image into the image of the virtual environment.

This locally stored and clipped-in object appears in front of the user and follows the user's navigational commands, giving a quicker understanding of the effects of particular control operations in the context of their result in the virtual environment. Due to the local storage within the browser of this "guiding" object, the same object (which, for example, might represent a cartoon character) provides the user with a familiar point of reference when navigating unfamiliar environments.

Where the virtual environment supports two or more different modes for movement within that environment, the apparatus clip store preferably contains data for at least one different further virtual environment object (guiding object) for each mode. As an example, where the virtual environment supports walking and flying modes (as in the case of VRML 2.0), respective guide objects in the shape of a car and a bird may be provided to remind the user that navigation is primarily in two or three dimensions, respectively. In this multi-mode case, where the received data defining the virtual environment includes specification of a mode for movement, the apparatus may suitably be configured to detect such specification and to automatically select an appropriate further virtual environment object.

To increase the general level of usability, the clip store may contain data defining a plurality of further virtual environment objects, with the apparatus being further configured to generate a display of said objects from which the user may select one such object. This would allow the user to set up their browser with a guiding object that they felt most comfortable with, for example, one that they do not find to be unduly obtrusive such a's would otherwise distract them from the virtual environment itself. Where such user selection is supported, the selection may be made from a menu or line-up of the objects, requiring one or more user operations of the user input means to select a particular guiding object, i.e., in such circumstances, it is preferable that the same controls as the user employs for navigating are used for selection of the guiding object.

Where the received data defining the virtual environment includes specification of a scale factor, the apparatus may suitably be configured to detect said specification and cause the rendering means to increase or decrease the size of the image of the further virtual environment object in accordance with this scale factor prior to patching of the rendered image into the image of the virtual environment. As an example, the received scale factor may comprise an indication of what, in terms of the virtual environment co-ordinate system, comprises a height of 1 meter thereby allowing the browser to scale the guiding object to an appropriate size in terms of the environment. Alternately, or additionally, this scaling of the guiding object may be controlled by the user, such as to reduce the size of an object that they would otherwise consider obtrusive. As a further feature, the browser may enable the user to disable the generation and patching in of the image of the further virtual environment object, effectively switching off the guiding object, which may be desirable once the user has become comfortable with the navigational controls.

BRIEF DESCRIPTION OF THE DRAWINGS

The invention will now be described, by way of example only, with reference to the accompanying drawings, in which.

DESCRIPTION OF THE PREFERRED EMBODIMENTS

Figure 1:
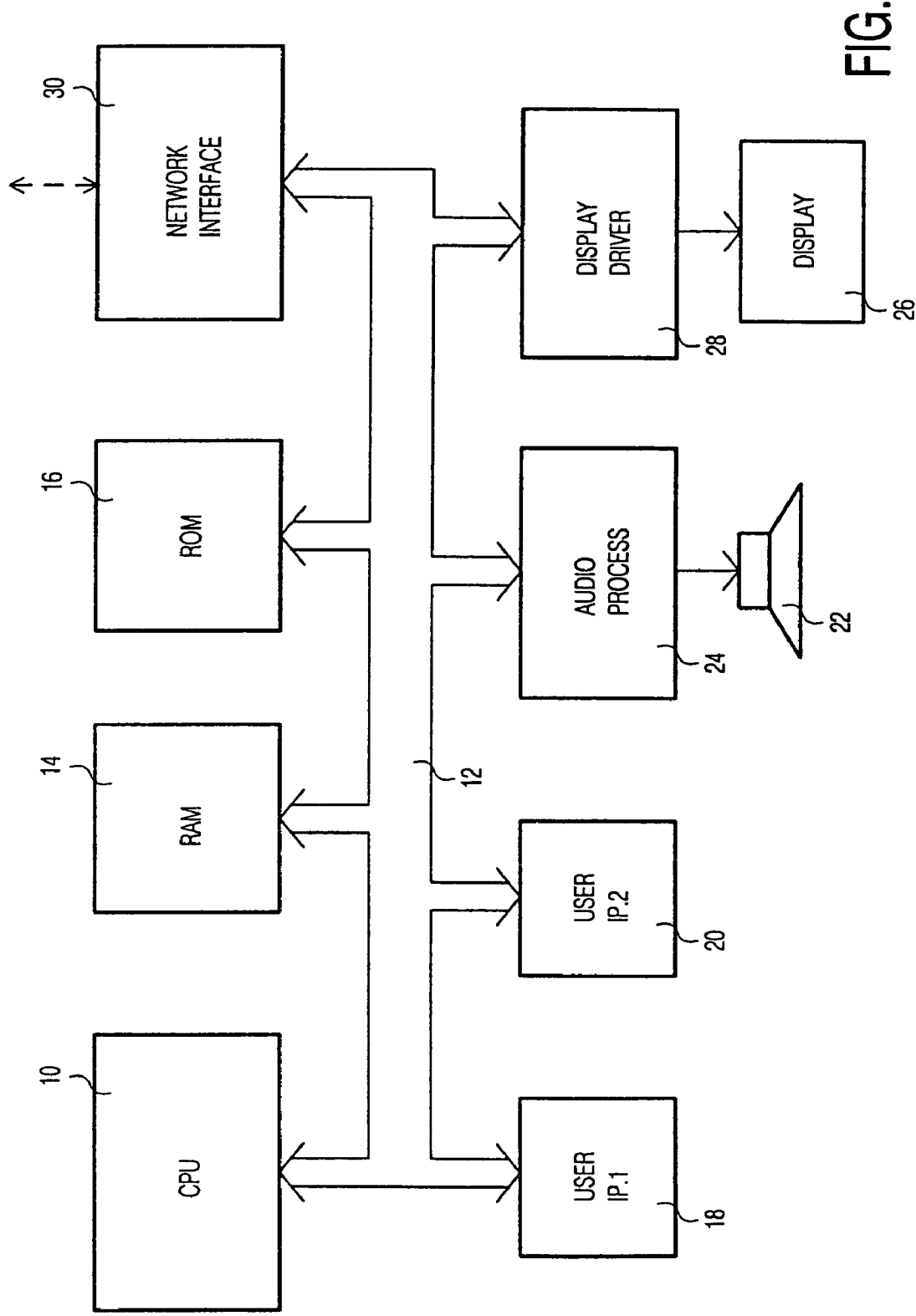
FIG. 1 is a block schematic diagram of a data processing system having access to remote sources of data defining virtual environments.

FIG. 1 represents a data processing system, such as a personal computer, which acts as host for a software utility that configures the system as a browser for data defining a virtual environment. The system comprises a central processing unit (CPU) 10 coupled via an address and data bus 12 to random-access (RAM) and read-only (ROM) memory devices 14, 16. The capacity of these memory devices may be augmented by providing the system with means to read from additional memory devices, such as a CD-ROM.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. In addition to providing amplification, the audio processing stage is preferably also configured to provide a signal processing capability under the control of the CPU 10 to allow the addition of sound treatments, such as echo, to existing audio data. Video output from the system is presented on display screen 26 driven by display driver stage 28 under control of the CPU 10.

A further source of data for the system is via an on-line link to remote sites, for example, via the Internet, to which end the system is provided with a network interface 30 coupled to the bus 12. The precise construction of the interface is not an essential feature of the present invention, although it will be recognized that the interface configuration will depend on the type of data network to which the system is to be coupled, i.e., for example, where the system is for use by a private home user, the data link is likely to be a telephone connection to a local service provider. In such a case, the interface 30 will suitably incorporate a modem. For other types of data link, such as an ISDN connection, the interface will be configured accordingly.

Figure 2:
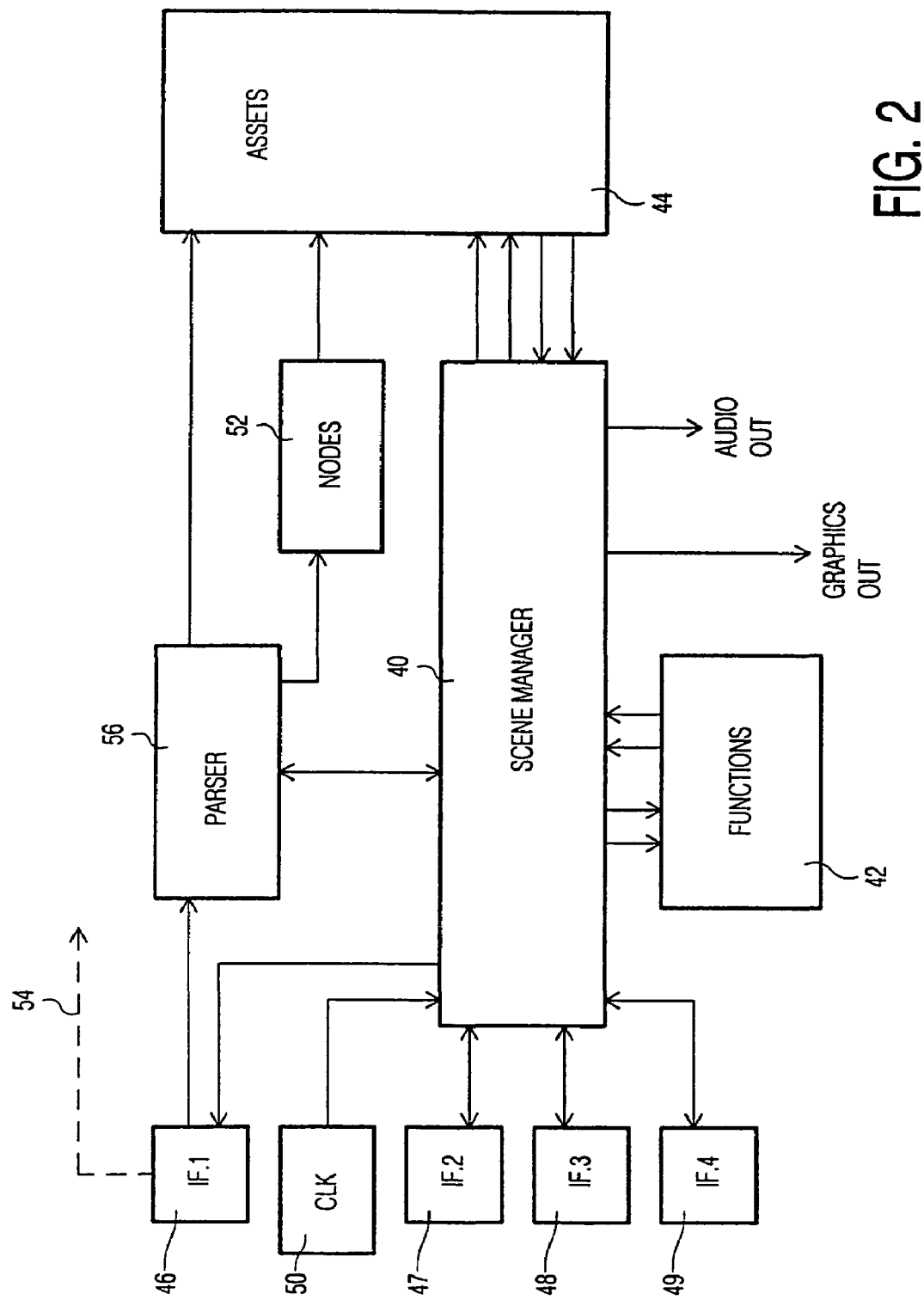
FIG. 2 represents the component functions of a browser, as hosted by the system of FIG. 1, and suitable to embody the invention.

Turning now to FIG. 2, the inter-relationship of a number of functions assembled to configure the hardware of FIG. 1 as a browser is illustrated. The functions in the example illustrated are particularly suited for browsing virtual environments defined in accordance with the VRML standard, version 2.0, issued as ISO/IEC WD14772 on 4 Aug. 1996, although it will be understood that the present invention is not restricted by, or limited to, conformance with this standard. Only those functions particularly required to support the navigational aid provided by the guiding object will be described in detail. A fuller description of the remaining features is given in the commonly assigned UK Patent Application 9711001.1, filed 29 May 1997, and unpublished at the priority date of the present application.

The browser is based around a scene manager 40 coupled with respective stores for functions 42, assets 44, and a hierarchy of scene nodes 52. In terms of the hardware of FIG. 1, the function, asset and hierarchy stores will generally be held in RAM 14, although some of the assets (including the clip-in files specifying the appearance of the various guiding objects as well as, for example, standardized texture maps) may be provided via off-line storage, such as CD-ROM. The browser implementation program is suitably held in ROM 16, optionally linked to the boot-up utility of the system. Also coupled with the scene manager are four interfaces (IF.1–IF.4) 46–49 and a clock 50. The first of the four interfaces 46 corresponds, in part, to interface 30 of FIG. 1, in that it represents the source of data received via the Internet, i.e., as represented by dashed line 54, the received data may be passed on from the interface to other (not shown) destinations, such as a further browser for HTML content in the received data. The first interface is the general arrival point for the data defining the virtual environment and, as such, it may also receive data from more local sources, such as storage on the system RAM (14; FIG. 1) or a CD-ROM.

From the first interface, the data passes to a parsing stage 56 which divides it into data defining or relating to assets (which data is then passed to store 44) and data defining or relating to the run-time node hierarchy (which data is then passed to store 52). In operation, it will generally be the case that only the data required (in terms of texture, co-ordinates, etc.) immediately or in the short term will actually be loaded up by the browser. Related information not immediately required is instead held in the form of an address for its current storage location, i.e., in the case of data called up via the Internet, the data held by the browser will suitably be a URL (uniform resource locator) so that the browser can simply call up the data, via the first interface IF.1, when the need for it becomes imminent.

The second interface 47 is an external API (application programming interface) comprising a set of interfacing subroutines required to enable multiple-user extensions to the system, such as two or more users having respective viewpoints within a common environment.

The third interface 48 is for operational segments used to program behavior in a scene, i.e., these segments are referred to, in VRML, as script nodes. The script nodes contain a program module which, in response to a change or user action within a scene, effect a change somewhere else in the scene depending on the contents of the program module. The program modules may suitably contain Java® language segments (Java is the object-oriented platform-independent and general-purpose programming environment developed by Sun Microsystems Inc). The third interface 48 provides a path to a Java interpreter which converts the Java segments from their platform-independent form to a form recognized by the host system. These script nodes may include a locally stored group associated with the clip-in guidance objects, such that the stored data defining the appearance of the object from multiple viewpoints may comprise a collection of three-dimensional VRML objects with a linking hierarchy defining their assembly to a three-dimensional guide character whose actions are partially straightforward responses to user navigational input, and partially due to one or more associated script nodes controlling a limited animation of the character. For example, the components may assemble to a humanoid guide object that beckons or starts to jump up and down if the user does not input navigational commands for a predetermined period.

The fourth interface 49 handles the passing of signals from (and in some instances to) the user input devices.

The functions (functional modules) held in store 42 include an audio manager, an MPEG decoder, features for node run-time implementations (such as collision detectors, three-dimensional pickers, viewpoint control (handling changes to the viewpoint location and/or orientation from which the image of the virtual environment is to be generated, in response to program instruction or user input)), and routing mechanisms.

The assets within store 44 are the basic building blocks and operational features from which the virtual environment is built up. These include three-dimensional geometry (defining the configuration and relative location of the polygons to be assembled for the virtual environment), textures, audio data, Java® code, user interaction data (for example, viewpoint control modes, identification of different user input devices, and so forth), and MPEG data.

The further store for run-time structures 52 contains the VRML scene graph together with routes to allow dynamic behavior. The scene graph is a hierarchical file specifying the connections between the various geometrical components making up an object within the virtual environment.

Figure 3:
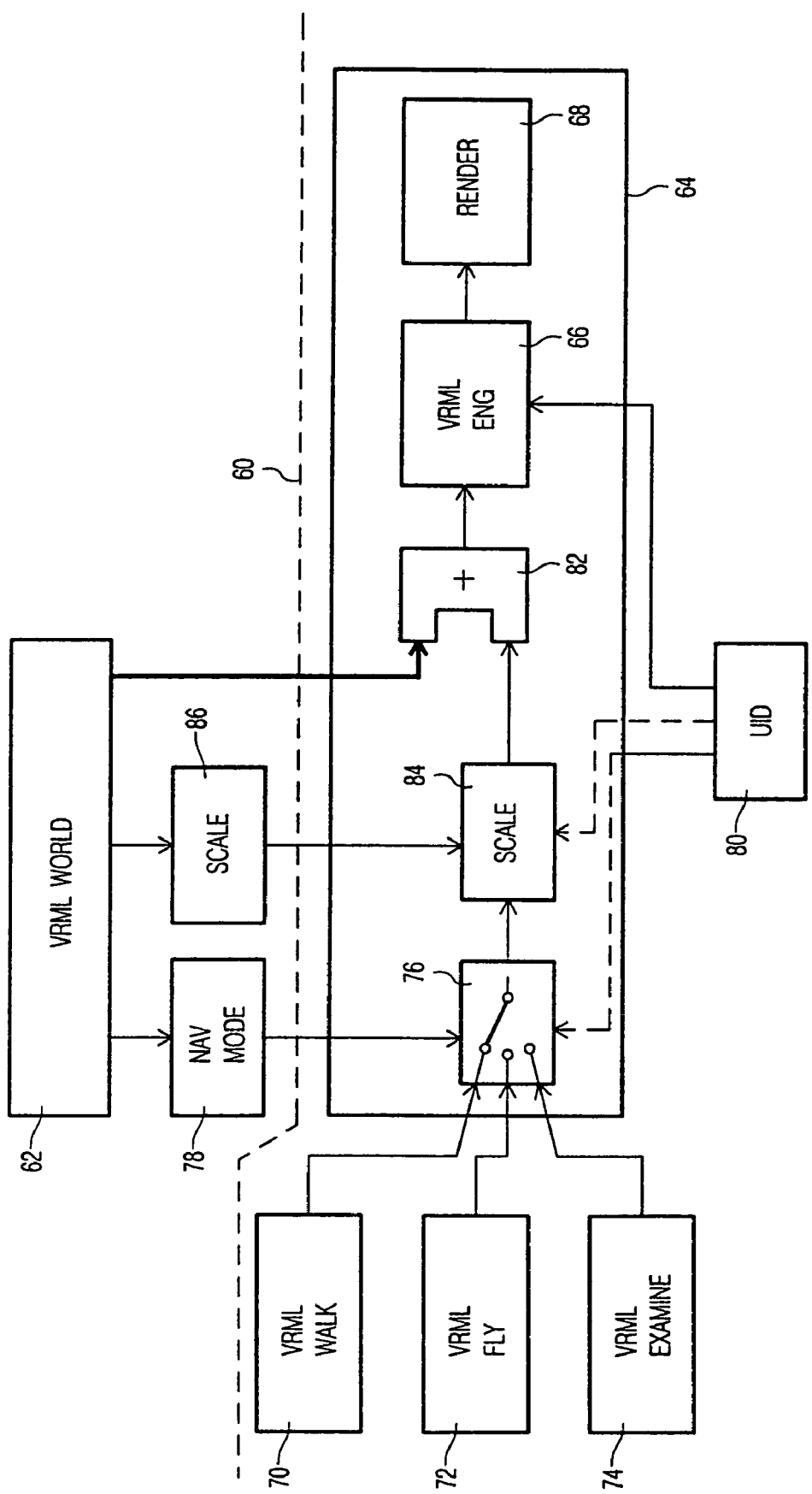
FIG. 3 illustrates the operation of the browser to generate a run-time visual aid in accordance with the invention.

FIG. 3 shows how various of the stored assets and internal functions of the browser of FIG. 2 operate to provide the guide character or object. Dashed line 60 illustrates the division between those features provided by a remote source, including the VRML world (virtual environment) data from source 62, and those local to (and within) the browser, represented by box 64.

As described, the browser 64 includes a VRML engine 66 which "builds" the virtual world based on stored three-dimensional geometry data, textures, and other contributing data including scripted run-time animations. All of these features are combined by the engine 66 into a data stream to renderer 68 which assembles and periodically updates the image provided to the user of the virtual environment.

Coupled with the browser 64 are three stored clip-in files 70, 72, 74, each containing data defining one or more guide objects, with each stored filed being associated with a different mode for travelling through/interacting with the virtual environment. These files may suitably be stored in system ROM (16; FIG. 1) or loaded from an external source (e.g., CD-ROM). The different modes represented are "walking" for the clip-in file 70, i.e., as with the motion of the user's viewpoint, the guide object will be capable of motion predominantly in two dimensions (although climbing stairs, walking up ramps, etc., may be accommodated). The second mode for which the guide character specified in clip-in file 72 is designed, is "flying" where the user has freedom of motion in three dimensions. The third mode is "examining", for which the guide object specified by clip-in file 74 may be under more direct user control, for example, a simulation of a human hand which may be controlled to interact with other objects within the virtual environment.

Accessing the stored clip-in files, and selecting between them is switch 76. Where the external source of the virtual environment includes a specification (from 78) of the most appropriate navigation mode for the particular environment currently being downloaded, this specification may be passed as shown to the switch 76 which automatically selects the appropriate clip-in file, and hence the appropriate guide object. Alternatively, or in addition, user input from UID 80 may determine the selection of the user's desired navigational guide object.

The output from switch 76 may be passed direct to a mixer 82 which adds the data defining the guide object to that defining the virtual environment and objects therein, as received from the remote source 62, such that the guide object will appear in the rendered image of the environment, with an object direction and/or orientation selected according to the input from UID 80, which input suitably thereafter effects relocation of the user viewpoint within the virtual environment. Preferably, however, before incorporation by the mixer, the guide object data is treated by scaling unit 84 to provide a guide in proportion to the virtual environment. An appropriate scaling factor may be included in the externally supplied data (from 86) or, as with the clip selection, it may be chosen in response to user input.

Figure 4:
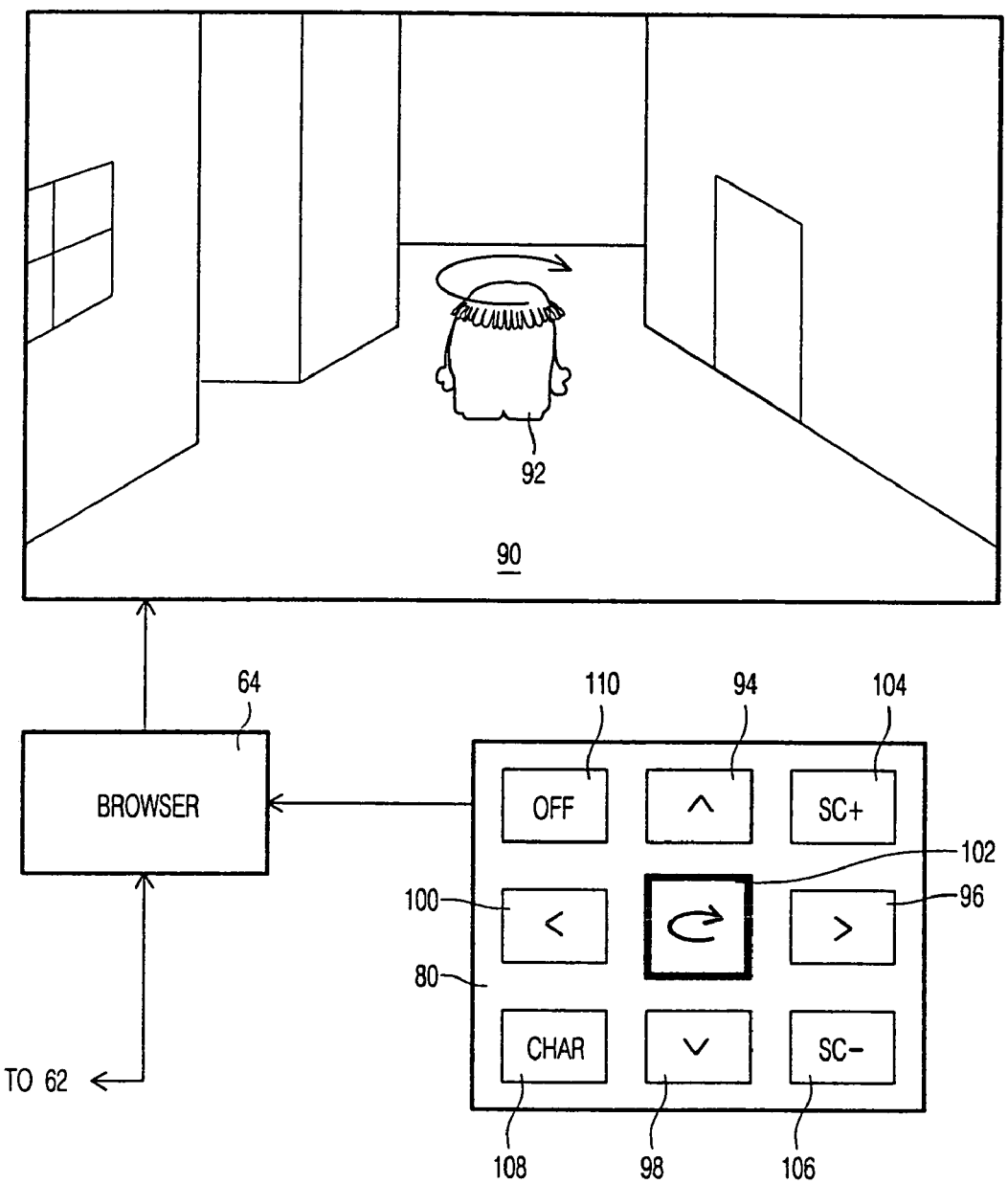
FIG. 4 schematically illustrates the generation and control of the run-time visual aid.

FIG. 4 schematically represents the operation of the guide object showing an image of a virtual environment 90 generated by browser 64 on the basis of data received from remote source 62 and in response to commands from UID 80. Within the generated image 90 of the virtual environment, the image of the guide object 92 appears. This object 92 is preferably a predetermined distance (in terms of the co-ordinate system of the virtual environment) ahead of the user viewpoint location, such that it remains in view at all times. Various strategies, such as shortening this distance by slowing movement of the guide or accelerating motion of the user, may be employed where the guide would otherwise move out of sight (for example, as it turned a corner), i.e., examples of some such strategies, in relation to a virtual camera dragged by a moving icon, are described in the commonly-assigned International Patent Application No. WO98/06068, filed Jun. 26, 1997, corresponding to U.S. Pat. No. 6,034,692.

As shown, the UID 80 may comprise a number of specialist controls for navigation within a virtual environment, i.e., it should be noted that the following navigational controls should not be taken as essential features, nor as the only possible controls, but only as examples of what may be provided. The UID 80 may suitably include four keys 94, 96, 98, 100 specifying movement in differing directions. Where only two-dimensional movement is supported, the keys may support forward 94, backward 98, right 96 or left 100 motion. Where movement in three dimensions is supported, the keys may specify up 94, down 98, right 96, left 100, and forwards horizontally (94 and 98 together). A further key 102 may cause the object to rotate about a vertical axis, as indicated. Further specialist keys may be provided to increase (104) or decrease (106) the size of the guide character relative to its surroundings, to change the selected form of the guide character (108), or to switch it off altogether (110) as may be desired once the user feels confident navigating the virtual environment and no longer requires the assistance of the guide object.

Although defined principally in terms of a software browser implementation, the skilled reader will be well aware than many of the above-described functional features could equally well be implemented in hardware.

From reading the present disclosure, other modifications will be apparent to persons skilled in the art. Such modifications may involve other features which are already known in the design, manufacture and use of image processing and/or data network access apparatus and devices and component parts thereof and which may be used instead of, or in addition to, features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it relates to the same invention as presently claimed in any claim and whether or not it mitigates any or all of the same technical problems as does the present invention. Applicants hereby give notice that new claims may be formulated to such features and/or combinations of such features during the prosecution of the present application or of any further application derived therefrom.

What is claimed is:

1. A data processing apparatus configured as a virtual environment data browser, the data processing apparatus comprising:
    a processor coupled with at least one memory device and data network interface means for receiving a first data set defining a virtual environment and objects therein when coupled to a data network including a source of the first data set;
    user input means and rendering means for periodically generating an image based on the first data set, and, from a viewpoint, at a location and with an orientation in said virtual environment determined at least partially by input from said user input means; and
    a clip store containing a second data set defining an appearance of a further virtual environment object when viewed from a plurality of directions, the second data set being independent of and unrelated to the first data set, wherein the rendering means generates an image of said further virtual environment object from a one of said plurality of directions determined by the user input commands to move said viewpoint, and patches said generated image into the image of the virtual environment so that the generated image appears in front of the user and follows the user's navigational commands.

2. The data processing apparatus as claimed in claim 1, wherein:
    the virtual environment supports two or more different modes for movement within the environment; and
    the apparatus clip store contains at least one other data set for at least one different further virtual environment object for each such mode, the at least one other data set being independent of and unrelated to the first data set.

3. The data processing apparatus as claimed in claim 2, wherein:
    the received data defining the virtual environment includes specification of a mode for movement; and
    the data processing apparatus detects said specification and automatically selects an appropriate virtual environment object from the second and at least one other data set.

4. The data processing apparatus as claimed in claim 1, wherein:
    said clip store contains a plurality of data sets defining a plurality of further virtual environment objects, the second data set being included in the plurality of data sets, each of the plurality of data sets being independent of and unrelated to the first data set; and
    the data processing apparatus generates a display of said plurality of further virtual environment objects from which the user may select one of said further virtual environment objects to be patched into a subsequently accessed virtual environment from the first data set.

5. The data processing apparatus as claimed in claim 4, wherein:
    said user selection of a further virtual environment object requires one or more user operations of said user input means.

6. The data processing apparatus as claimed in claim 1, wherein:
    the first data set defining the virtual environment includes specification of a scale factor; and
    the data processing apparatus detects said specification and causes the rendering means to increase or decrease the size of the image of the further virtual environment object in accordance with the scale factor and prior to patching of said image into the image of the virtual environment.

7. The data processing apparatus as claimed in claim 1, wherein the data processing apparatus is operable, in response to user input, to increase or decrease the size of the rendered image of the further virtual environment object in relation to the image of the virtual environment.

8. The data processing apparatus as claimed in claim 1, wherein the apparatus is further operable, in response to user command, to cease the generation and patching in of said image of said further virtual environment object while continuing the generation of the virtual environment.

* * * * *